(12) United States Patent
Matthiesen et al.

(10) Patent No.: US 9,930,032 B2
(45) Date of Patent: *Mar. 27, 2018

(54) SELECTIVE PASSWORD SYNCHRONIZATION

(71) Applicant: International Business Machines Corporation, Armonk, NY (US)

(72) Inventors: Brian R. Matthiesen, Rancho Santa Margarita, CA (US); Britton G. Thrasher, Mission Viejo, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/396,980

(22) Filed: Jan. 3, 2017

(65) Prior Publication Data

US 2017/0118194 A1    Apr. 27, 2017

Related U.S. Application Data

(63) Continuation of application No. 15/141,979, filed on Apr. 29, 2016, now Pat. No. 9,544,281, which is a
(Continued)

(51) Int. Cl.
*G06F 15/16* (2006.01)
*H04L 29/06* (2006.01)

(52) U.S. Cl.
CPC .......... *H04L 63/083* (2013.01); *H04L 63/102* (2013.01); *H04L 63/20* (2013.01)

(58) Field of Classification Search
CPC ....... G06F 21/31; H04L 63/083; H04L 63/08; H04L 63/102
(Continued)

(56) References Cited

U.S. PATENT DOCUMENTS 5,944,824 A * 8/1999 He ........................ G06F 21/33
                                                          726/6
6,144,959 A * 11/2000 Anderson ............... G06F 21/31
(Continued)

FOREIGN PATENT DOCUMENTS

| CN | 103605579 A | 2/2014 |
| EP | 0773489 B1 | 1/2002 |
| EP | 1338968 B1 | 11/2009 |

OTHER PUBLICATIONS

List of IBM Patents or Patent Applications Treated as Related, Jan. 3, 2017, 2 pages.
(Continued)

*Primary Examiner* — Evans Desrosiers
(74) *Attorney, Agent, or Firm* — Francis Lammes; Stephen J. Walder, Jr.; Jeffrey S. LaBaw

(57) ABSTRACT

A mechanism is provided for selective password synchronization. An indication is received that a password is to be changed for an account in a plurality of accounts associated with an individual, where the indication includes a new password. Responsive to receiving the indication of the password change, the account is grouped with one or more other accounts in the plurality of accounts thereby forming a first subset of accounts, where grouping the account with the one or more other accounts in the plurality of accounts excludes at least one account in the plurality of accounts thereby forming a second subset of accounts. The new password is propagated to the first subset of accounts according to a first policy. The new password is propagated to a second subset of accounts of the plurality of accounts according to a second policy, where the second policy is different from the first policy.

16 Claims, 5 Drawing Sheets

Related U.S. Application Data continuation of application No. 14/571,675, filed on Dec. 16, 2014, now Pat. No. 9,372,986.

(58) Field of Classification Search
USPC .......... 726/6, 18, 20; 713/172–174; 709/238–244
See application file for complete search history.

(56) References Cited

U.S. PATENT DOCUMENTS

| | | | |
|---|---|---|---|
| 6,240,184 | B1 | 5/2001 | Huynh et al. |
| 9,282,093 | B2 | 3/2016 | Luk et al. |
| 2001/0047281 | A1* | 11/2001 | Keresman, III .... G06F 21/6245 705/2 |
| 2004/0025026 | A1 | 2/2004 | Karp et al. |
| 2010/0100948 | A1 | 4/2010 | Delia et al. |
| 2012/0072977 | A1 | 3/2012 | Lewis |
| 2016/0057126 | A1 | 2/2016 | Gargaro et al. |

OTHER PUBLICATIONS

"Centralized Password Synchronization Service", IBM Corporation, www.ip.com, IP.com No. IPCOM000132099D, Dec. 1, 2005, 2 pages.

\* cited by examiner

| SELECT | ACCOUNT ID | ACCOUNT SERVICE | DESCRIPTION |
|---|---|---|---|
| ☐ | JDoe | Windows AD | Personal AD Account |
| ☐ | Administrator | Windows AD | Administrative AD Account |
| ☐ | JohnD | Linux | Personal Linux Account |
| ☐ | JDoe | DB2 | Personal DB2 Account |
| ☐ | JDoe | Notes | Personal Notes Account |
| ☐ | Root | Linux | Admin Linux Account |
| ☐ | JDoe | RACF | Personal RACF Account |

*FIG. 4A*

| SELECT | ACCOUNT ID | ACCOUNT SERVICE | DESCRIPTION |
|---|---|---|---|
| ☒ | JDoe | Windows AD | Personal AD Account |
|  | Administrator | Windows AD | Administrative AD Account |
| ☒ | JohnD | Linux | Personal Linux Account |
| ☒ | JDoe | DB2 | Personal DB2 Account |
| ☒ | JDoe | Notes | Personal Notes Account |
|  | Root | Linux | Admin Linux Account |
|  | JDoe | RACF | Personal RACF Account |

*FIG. 4B*

SELECTIVE PASSWORD SYNCHRONIZATION

BACKGROUND

The present application relates generally to an improved data processing apparatus and method and more specifically to mechanisms for selective password synchronization.

Identity Management (IdM) is the management of individuals and their authentication, authorization, and privileges within or across system and enterprise boundaries with the goal of increasing security and productivity while decreasing cost, downtime, and repetitive tasks. One of the main functions of an IdM system is password management, which is an ability to set, reset, and/or change passwords on identities (accounts). Many IdM solutions provide the capability to synchronize passwords across accounts, but the current methodology lacks the granularity needed in real-world environments and security requirements.

That is, current password synchronization mechanisms within password management force a same password across all accounts owned by an individual, such that the same password has to be utilized on all accounts or none of the accounts. Therefore, these current password synchronization mechanisms fail to address typical real-world environments where individuals have multiple accounts on the same resource or multiple types of accounts with different risk levels. Further, most environments have some resources that require password complexity rules that are in conflict with other resources. In these environments, password synchronization fails, as there is no way to meet the conflicting password rules with the same password value.

SUMMARY

In one illustrative embodiment, a method, in a data processing system, is provided for selective password synchronization. The illustrative embodiment receives an indication that a password is to be changed for an account in a plurality of accounts associated with an individual. In the illustrative embodiment, the indication includes a new password. The illustrative embodiment groups the account with one or more other accounts in the plurality of accounts thereby forming a first subset of accounts in response to receiving the indication of the password change. In the illustrative embodiment, grouping the account with the one or more other accounts in the plurality of accounts excludes at least one account in the plurality of accounts thereby forming a second subset of accounts. The illustrative embodiment propagates the new password to the first subset of accounts according to a first policy. The illustrative embodiment propagates the new password to a second subset of accounts of the plurality of accounts according to a second policy where the second policy is different from the first policy.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions that, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4A depicts an example presentation of accounts as presented by a selective password synchronization mechanism in accordance with the illustrative embodiments;

FIG. 4B depicts an example selection of an account from a plurality of accounts in accordance with the illustrative embodiments;

DETAILED DESCRIPTION

Figure 1:
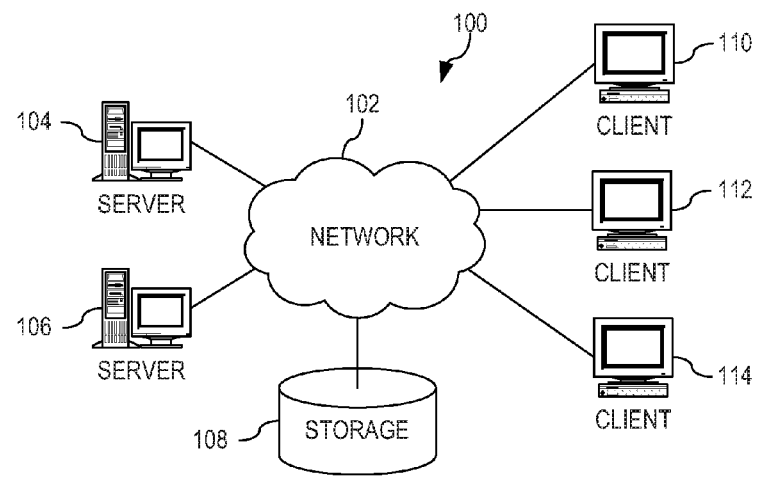
FIG. 1 is an example diagram of a distributed data processing system in which aspects of the illustrative embodiments may be implemented.

As stated previously, current password synchronization mechanisms within password management force a same password across all accounts owned by an individual, such that the same password has to be utilized on all accounts or none of the accounts. However, the forcing of the same password by these current password synchronization mechanisms presents a number of issues, such as:

1. If all accounts owned by an individual have the same password, once one account's password is compromised, all accounts of the individual could be accessed, which may be a major security risk.
2. In heterogeneous environments, password complexity rules may be in conflict, which would cause failures when trying to synchronize the same password value. For example, Linux® may require a minimum password length of 10 characters, while IBM®'s Resource Access Control Facility (RACF®) may have a maximum length of 8 characters.
3. Individuals that have multiple accounts on the same resource, such as a personal account and an administrator account on the same Linux® server, should not have the same password for both accounts.

4. High-risk accounts should not have the same password as low-risk accounts.

5. Password synchronization may need to be governed differently for different types of individuals, such as employee versus contractor.

These issues may be summarized as issues arising from individuals having multiple accounts on the same or different resources or multiple types of accounts with different risk levels on the same or different resources and being required by current password synchronization mechanisms. In order to address these issues, the illustrative embodiments provide mechanisms for selective password synchronization. The mechanisms of the illustrative embodiments address these issues by providing logic and functionality for selectively synchronizing account passwords, or other authentication identifiers, associated with resources based on various synchronization rules and criteria that can be used to dictate or govern which accounts can have the same or similar passwords and which accounts cannot have the same or similar passwords. These mechanisms may synchronize passwords, or other authentication identifiers, associated with a set of accounts selectively based on a static and/or dynamic definition of the subsets of accounts for which the passwords may be synchronized and/or subsets of accounts for which the passwords cannot be synchronized.

That is, the illustrative embodiments provide for granular level password synchronization through password synchronization policies, password synchronization rules, and/or password synchronization exclusion rules, where selective assignment of resources, account types, individual types, or any other types of filtering mechanisms are utilized to determine which passwords among various accounts are to be synchronized. In one preferred embodiment, the password synchronization policies group the accounts of an individual based on the individual's role within the enterprise utilizing one or more password synchronization rules and one or more password synchronization exclusion rules. However, in other preferred embodiments, the password synchronization process may be implemented independent of an individual's role. That is, a password synchronization policy dictates which of an individual's accounts will have their passwords synchronized during a password change, or account creation or restoration operation, based on the individual's role within the enterprise or based on some other persistent predetermined criteria associated with the individual. Some illustrative embodiments provide password synchronization policies based on roles, such as personal, employee, contractor, administrator, manager, executive, etc., as well as based on other persistent groupings, such as, for example, enterprise versus personal. If the password synchronization policy is based on a role of the individual, then, as one example, the password synchronization policy may indicate that a personal account of an administrator should not synchronize with any of the administrator's administration accounts. If the password synchronization policy is based on persistent predetermined criteria, then the password synchronization policy may indicate that accounts with conflicting password complexity should not synchronize with each other. In accordance with the illustrative embodiment, each of the password synchronization policies may be enabled or disabled.

The password synchronization rules define subsets of resources for which passwords are to be synchronized. The password synchronization rules may be defined by resource type, such as a Linux® system, a Resource Access Control Facility (RACF®) system, or the like, in order to address, for example, issues 1 and 2 listed above, by preventing accounts that have restrictions on lengths of passwords based on system requirements from synchronizing with each other and thus, reducing the risk that if one account on one system is compromised, the account on the other system will still be secure since the passwords are different. The password synchronization rules may further utilize resource tags that are indicated in metadata, such as physical location or network on which the account resides, in order to address, for example, issues 1 and 3 listed above by preventing accounts that reside on a same resource from having a same password so that, if one account on the resource is compromised, the other account will not be compromised since that account will not have a same password. The password synchronization rules may further comprise filters that restrict the password change to only those accounts that match the filter criteria, in order to address, for example, issues 1, 3, 4, and 5 listed above. That is, by only changing the passwords for those account that are grouped together based on the matching of the filter, and thereby preventing a personal account from synching with an administrative account if the filter restricts personal accounts from synching with administrative accounts; preventing high-risk accounts from synching with low-risk accounts if the filter restricts high-risk accounts from being included with low-risk accounts, or requiring contractor accounts to be handled differently from employee accounts, then, if one or more accounts not governed by the filter are compromised, accounts that are governed by the filter will not be compromised since the accounts governed by the filter will not have a same password.

The password synchronization rules may also comprise a static list of specific resources, i.e. a specific list of resources, such as, for example: Server1, TestDb2, and MailServerEast, in order to address, for example, issues 1, 3 and 5 listed above by requiring accounts on the static list of resources not have a same password so that, if one account on the resource is compromised, the other account will not be compromised since that account will not have a same password. That is, the password synchronization exclusion rules define subsets of resources that are excluded from having the same password as those defined in the password synchronization rules based on one or more of resource type of the resources such that resources that have different password requirements are excluded from password synchronization operations, resource tags that are indicated in metadata associated with the resources such that resources having those resource tags are excluded from password synchronization operations, filters for filtering resources of various types from having passwords synchronized, or a static list of specific resources that are not to be synchronized using the password synchronization rules. Not only should these passwords be excluded during password synchronization, as implied by their omission from the password synchronization rules, but the passwords associated with accounts identified in the password synchronization exclusion rules will be specifically excluded from having identical passwords as those included in the password synchronization rules. The selection and filtering criteria identified through the password synchronization policies, password synchronization rules, and/or password synchronization exclusion rules are utilized to synchronize account passwords in each individual subset of accounts of an individual.

Thus, the illustrative embodiments provide mechanisms for selective password synchronization. Password synchronization is provided at a granular level through password synchronization policies, password synchronization rules, and/or password synchronization exclusion rules. That is, a selective assignment of resources, account types, individual types, or any other types of filtering mechanisms are utilized to determine among which accounts, passwords associated with those accounts, are to be synchronized. The password synchronization policies group the accounts of an individual utilizing one or more password synchronization rules and one or more password synchronization exclusion rules, which may be based on an individual's role within the enterprise or based on some other predetermined criteria associated with the individual. Accordingly, the password synchronization policies dictates which of an individual's accounts will have their passwords synchronized during a password change or account creation or restoration based on a predetermined criteria, thereby preventing all accounts from being compromised if one account is compromised.

Before beginning the discussion of the various aspects of the illustrative embodiments in greater detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

Figure 2:
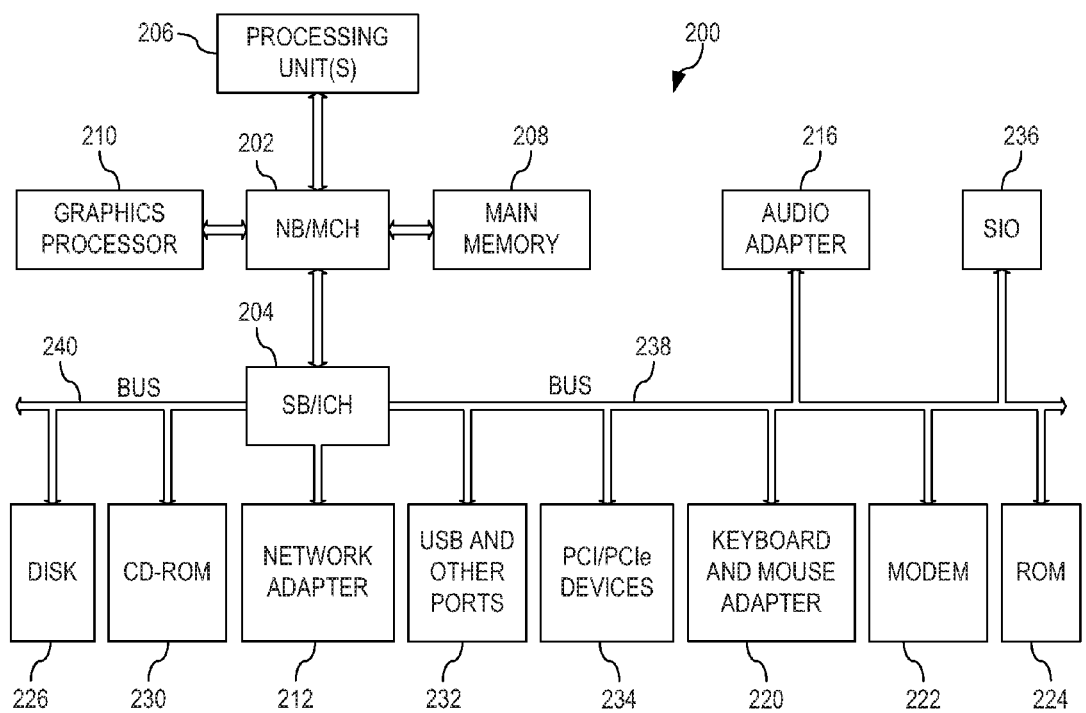
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer System p POWER8 computer system, running the Advanced Interactive Executive (AIX) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
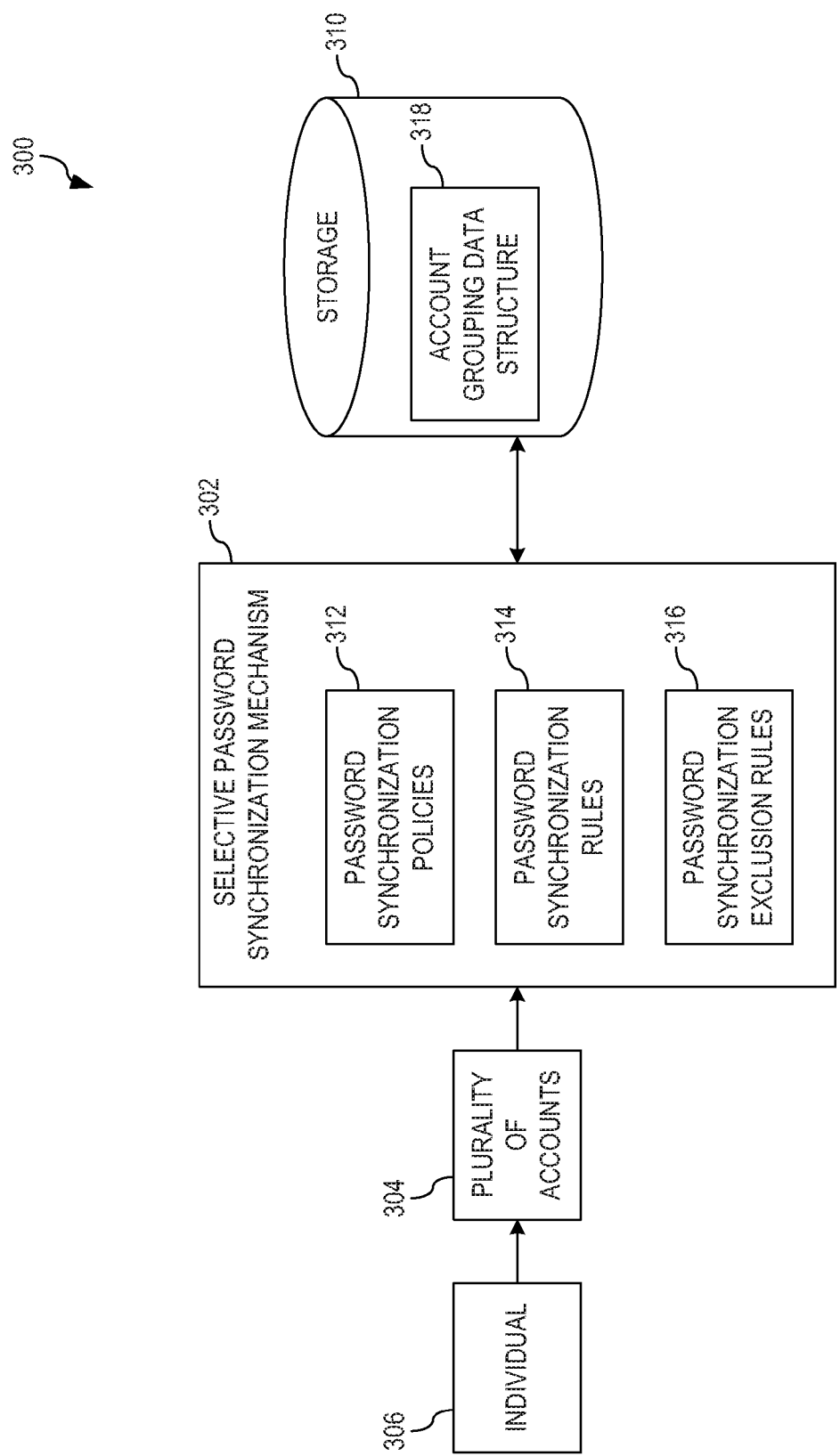
FIG. 3 depicts a functional block diagram of a selective password synchronization mechanism in accordance with an illustrative embodiment.

In order to selectively synchronize subsets of passwords from a larger set of passwords, the illustrative embodiments provide a selective password synchronization mechanism that statically and/or dynamically defines one or more subsets of accounts for which passwords are to be synchronized. FIG. 3 depicts a functional block diagram of such a selective password synchronization mechanism in accordance with an illustrative embodiment. The functional block diagram of FIG. 3 may be implemented, for example, by one or more of the computing devices illustrated in FIG. 1 and/or data processing system 200 of FIG. 2. As shown in FIG. 3, the selective password synchronization mechanism 302 may be provided as part of an Identify Management (IdM) data processing system 300. In the IdM data processing system 300, a plurality of individuals each have a plurality of user accounts that are identified in an account data structure, such as may be stored in storage 310, for example.

In performing password management for a particular individual, such as when individual 306 wants to change a password or when one password associated with one account is required to be changed due to password policies that are implemented, such as when a password expires, becomes compromised, or another triggering event that would cause a need for the modification of an individual's password on at least one account associated with the individual, selective password synchronization mechanism 302 identifies the plurality of accounts 304 associated with the particular individual 306. The selective password synchronization mechanism 302 identifies information associated with the plurality of accounts 304 owned by individual 306 that are to be password managed. For each account, the information may include, for example, first name, middle name, last name, username, current password, account accessed by the username and password, type of the account, resource type where the account resides, location of resource, risk level of the account, position or role of the individual within the enterprise, and/or other demographic and individual account or user identification information. The metadata associated with the account indicates a type of the account based on one or more pre-defined account types that indicate a level of access or privilege associated with the account holder, such as whether the account is, for example, a personal account, an administrator account, or another type of account corresponding to a level of access associated with the associated individual. The resource type where the account resides indicates a pre-defined type designation for the resource that indicates the capabilities, functionality, and requirements of the resource, e.g., whether the resource is, for example, a Linux® system that requires a minimum password length of 10 characters, and an IBM®'s Resource Access Control Facility (RACF®) system that requires a maximum length of 8 characters, or another type of system or resource for which password requirement characteristics are known. The metadata associated with the account or resource location indicates the physical and/or virtual location of the resource, for example, country, state, county, enterprise, building, etc., network address and/or identifier of the network on which each account resides, or the like. With the advent of cloud computing, this may not always be identifiable and, thus, if it is not identifiable, the resource location may be identified as unascertainable. The risk level of the account indicates a level of risk that breaching the security of the account poses to resources of an enterprise, for example, whether the account is a high-risk account, a medium-risk account, a low-risk account, or the like. Finally, the position or role of the individual within the enterprise indicates a level of responsibility and privilege within the enterprise, for example, employee, contractor, Information Technology (IT) administrator, manager, executive, or any other defined role that may be correlated with a risk level or other criteria used for account password management as may be readily apparent to those of ordinary skill in the art in view of the present description.

Once selective password synchronization mechanism 302 has identified the plurality of accounts 304 for the individual 306, selective password synchronization mechanism 302 may then utilize password synchronization policies 312 to group the accounts of the individual into one or more subsets of accounts, where each subset of account comprises one or more accounts from plurality of accounts 304. In one embodiment, selective password synchronization mechanism 302 may utilize password synchronization policies 312 that are based on individual's role within the enterprise. However, in alternative embodiments, selective password synchronization mechanism 302 may utilize password synchronization policies 312 that are role independent. Role based password synchronization policies may specify particular types of accounts associated with a role, or not associated with the role, for which password synchronization should or should not be performed. For example, if the password synchronization policy is based on a role of the individual as a manager at an enterprise, then the password synchronization policy may indicate that a personal account of a manager should not synchronize with any of the manager's managerial accounts. Role independent password synchronization policies provide policies that are dependent upon other factors than a particular individual's role, such as location, timing, resource type, or the like. Thus, if the password synchronization policy is role independent and is based on persistent predetermined criteria of a geographical location of a resource, then the password synchronization policy may indicate that passwords can only be synchronized for resources within the same country, for example.

Selective password synchronization mechanism 302 utilizes a particular one of password synchronization policies 312 to group the plurality of accounts 304 of individual 306 utilizing one or more password synchronization rules 314, one or more password synchronization exclusion rules 316, and the information associated with each account 304. That is, password synchronization rules 314 define subsets of resources for which passwords are to be synchronized. Password synchronization rules 314 may be defined as being based on resource type, resource tags that are indicated in metadata, particular filter criteria, a static list of specific resources, or the like. Examples of password synchronization rules 314 may include, but are not limited to:

Employee account passwords synchronize between active directories and email accounts.
Passwords synchronize for resources within the same location, whether the location is based on, for example, country, state, county, enterprise, building, or the like.
Passwords synchronize for similar resources, for example: all database accounts individual 306 owns.
Passwords synchronize to all accounts individual 306 owns on resources with a metatag value of "Test Server."
Passwords synchronize to all accounts individual 306 owns on resources in a specific network subnet (e.g. 192.168.1.*).
Passwords synchronize to all accounts individual 306 owns that begin with a specific sequence of characters (e.g. "XXTEST*").

In accordance with the illustrative embodiments, selective password synchronization rules 314 may be static rules or dynamic rules. Static rules include specific resources to synchronize account passwords among, such as, for example: Server1, TestDb2, and MailServerEast. Whereas dynamic rules are based on filtering, such that when new resources are defined in IdM data processing system 300 that match one or more filter criteria of one or more filters, these new resources would not have to be manually added to the synchronization rules. For example, any resource that has an IP address that starts with 192.168.1, any accounts that have an identifier that starts with "XXTEST*" no matter what resource those accounts are associated with, any resource with a metatag of "Test Server", and the like, are examples of dynamic rules that may be applied to the characteristic information for a newly discovered resource such that the newly discovered resource may be dynamically added to a corresponding password synchronization subset.

In addition to password synchronization rules 314, selective password synchronization mechanism 302 also includes password synchronization exclusion rules 316 that define one or more subsets of resources that should not have the same password as those defined in the password synchronization rules. Not only should these passwords be excluded during password synchronization, as implied by their omission from password synchronization rules 314, but the selective password synchronization mechanism 302 will actually prevent accounts identified in password synchronization exclusion rules 316 from having identical passwords as those accounts included in the subsets of accounts associated with, or generated based on, the password synchronization rules 314. Examples of password synchronization exclusion rules 316 may include, but are not limited to:

Personal account passwords do not synchronize with administrator account passwords.
Contractor account passwords do not synchronize between active directories and email accounts.
Accounts with conflicting password complexity rules do not synchronize.
Low-risk account passwords do not synchronize with high-risk account passwords.

Thus, in accordance with one embodiment, selective password synchronization mechanism 302 may perform the grouping of accounts into the one or more subsets of accounts utilizing one or more password synchronization rules 314 and one or more password synchronization exclusion rules 316 according to the information associated with each account 304, e.g., password synchronization rules 314 operate to add accounts to various groupings whereas password synchronization exclusion rules 316 operate to exclude accounts from groupings. Thus, if an account would be added to a grouping by the password synchronization rules 314, the password synchronization exclusion rules 316 may supersede such an addition and may in fact exclude that account from being part of the grouping. It should be appreciated that while the rules 314 and 316 may be used to dynamically generate groupings of accounts, in other alternative embodiments, persistent groupings of accounts may be utilized either instead of or in addition to the dynamic generation of groupings of accounts.

Selective password synchronization mechanism 302 then stores each subset of accounts generated by the grouping operation in account grouping data structure 318. In a preferred embodiment, this grouping is performed at runtime, for example, when the password is being set, modified, or reset. However, as noted above, in some illustrative embodiments, a persistent grouping of accounts may be provided in account grouping data structure 318. For example, when individual 306 wants to change a password, or when a password associated with an account is required to be changed, such as when a password expires, becomes compromised, or another triggering event that would cause a need for the modification of an individual's password on at least one account associated with the individual occurs, selective password synchronization mechanism 302 presents a list of accounts owned by individual 306 to individual 306, such as via a client computing device operated by the individual 306. If the password change is initiated by individual 306, selective password synchronization mechanism 302 presents a list of all accounts individual 306 owns.

Of all the accounts presented, when individual 306 selects one account for which to change a password, selective password synchronization mechanism 302 evaluates the account against the password synchronization rules 314 and the password synchronization exclusion rules 316. Selective password synchronization mechanism 302 then automatically selects any other accounts associated with the selected account that have characteristic information, i.e. information particular to the account, such as a common beginning portion of an IP address, a common account identifier, a common metatag, or the like, that matches one or more of the criteria specified in the password synchronization rules 314 and the password synchronization exclusion rules 316. Any other accounts that do not have characteristic information that matches one or more of the criteria specified in the password synchronization rules 314 and the password synchronization exclusion rules 316 as being associated with the selected account would not be selected. The selected accounts are then either included in the grouping of a subset of accounts to be updated along with the selected account (i.e. in the case where the account matches the requirements of the password synchronization rules 314 and does not match the requirements of the password synchronization exclusion rules 316) or excluded from the subset of accounts to be updated along with the selected account (i.e. in the case where the account matches the requirements of one or more of the password synchronization exclusion rules 316).

As another example, when individual 306 is required to change a password, selective password synchronization mechanism 302 presents a list of the accounts that requires a password change, along with any other accounts associated with the account that require a password change, that have characteristic information that matches one or more of the criteria specified in the password synchronization rules 314 and are not excluded by the password synchronization exclusion rules 316. Any other accounts that do not have characteristic information that matches one or more of the criteria specified in the password synchronization rules 314 and are excluded by the password synchronization exclusion rules 316 as being associated with the account that requires a password change would not be presented.

The individual may enter a new password for use with the selected account. This new password, once verified as meeting necessary password requirements, may be propagated to the other accounts grouped with the selected account in the subset of accounts, after application of the rules 314 and 316. That is, based on the final one or more subsets formed by grouping various ones of the plurality of accounts using rules 314 and 316, before propagating a password to other accounts in the particular one or more subsets of accounts, selective password synchronization mechanism 302 first determines whether the password meets the criteria associated with the particular subset of accounts. For example, if the password to be updated is for a subset of accounts that require a minimum password length of 10 characters, then selective password synchronization mechanism 302 ensures that the new password submitted for that subset of accounts meets that criterion. As another example, if the password to be updated is for a subset of accounts that require a maximum of 8 characters, then selective password synchronization mechanism 302 ensures that the new password submitted for that subset of accounts meets that criterion.

In accordance with the illustrative embodiments, selective password synchronization mechanism 302 prevents any accounts that require a maximum of 8 characters from being grouped with accounts that require a minimum password length of 10 characters and vice versa, for example. Other criteria may also be required and checked in this manner including, for example, such criteria as requiring both alphabetic characters and at least one numerical character, at least one symbol character being required, at least one capitalized character being required, the password not matching a previously entered or used password for that subset of accounts, or the like. Once selective password synchronization mechanism 302 verifies that the password meets the criteria for the particular subset of accounts, selective password synchronization mechanism 302 propagates the new password to all of the individual's accounts in the subset of accounts formed by the password synchronization policy utilizing one or more password synchronization rules 314 and one or more password synchronization exclusion rules 316 and the information associated with each account.

The following is an example scenario performed by a password synchronization mechanism, such as selective password synchronization mechanism 302 of FIG. 3. The example is for password synchronization utilizing a password synchronization policy for an IT system administrator. That is, the exemplary scenario associates an IT system administrator with a password synchronization policy that synchronizes a subset of IT system administration accounts, while preventing other personal accounts for the IT system administrator from having the same password.

Password synchronization policy
        Name: Password synchronization for IT system administrator
        Scope: IT organizational unit
        Membership: IT system administrator role
        Enabled: Yes
    Password synchronization rules
        All DB2 resources
        Any service with the tag "Test Server"
        All Linux® servers that are in the 192.168.1.*
            Subnet (filter: IP=192.168.1.*)
        Windows local server windev123
        AIX® server aixdev176
        Any active directory account with country set to US
            (filter: (&(objectclass=ADAccount)(c=US)))
        Any account with an ID that begins with "XXTEST"
            (filter: username=XXTEST*)
    Password synchronization exclusion rules
        Any resource beginning with the name 'prod'
            (filter: hostname=prod*)
        Windows domain controller adus4
        Any account with ID that begins with "XXADMIN"
            (filter: username=XXADMIN*)

In this scenario, an individual in the IT system administration role changes their password on the account 'aixdev176'. Utilizing the password synchronization rules 314, the same password will be synchronized among the accounts associated with the individual on any managed DB2 resource, any service with a tag of "Test Server", any Linux® server with IP that begins with 192.168.1, windev123, any active directory account in the US, and any account that has an ID beginning with "XXTEST". Utilizing the password synchronization exclusion rules 316, the same password will not be synchronized among the accounts associated with the individual with any resource with the names beginning with 'prod', Windows domain controller 'adus4', and accounts that begin with 'XXADMIN'. Thus, the selective password synchronization mechanism 302, through application of the password synchronization exclusion rules 316, prevents these accounts from having the same password as those synchronized by the password synchronization rules 314. Hence, the selective password synchronization mechanism 302 propagates the new password to all of the individual's accounts in the subset of accounts formed by the password synchronization policy based on, in this example, the individual's role within the enterprise utilizing one or more password synchronization rules 314, one or more password synchronization exclusion rules 316, and the information associated with each account. In other illustrative embodiments, the password synchronization policy may not be role based and may in fact be role independent.

In addition to utilizing a password synchronization policy for an IT system administrator as exemplified above, the illustrative embodiments may provide password synchronization policies for other roles, such as personal, employee, contractor, manager, executive, etc. Each of the password synchronization policies may differ for each of the roles, such as, for example, an employee account can synchronize between an active directory and an email account, but a contractor account should not synchronize between an active account and an email account because a contractor does not have an email account with the enterprise. As another example, a password synchronization policy for an executive's enterprise email account should not synchronize with the executive's personal email account because if the executive's personal email account becomes compromised the executive's enterprise email account would still be secure.

FIG. 4A depicts an example presentation of accounts as presented by selective password synchronization mechanism in accordance with one illustrative embodiment. As shown in FIG. 4A, in screen 400, the selective password synchronization mechanism in an Identity Management (IdM) data processing system presents the individual with a list of all accounts 410a-410g owned by the individual. The selective password synchronization mechanism presents, in screen 400, information associated with each account for a particular individual by identifying a plurality of accounts associated with the particular individual in an account data structure that stores a plurality of user accounts for a plurality of individuals. For each account, the selective password synchronization mechanism presents information such as, for example, Account Identifier (ID) 402, Account Service 404, and Description 406. The selective password synchronization mechanism also presents, in screen 400, selection mechanisms 408, whereby the individual may select an account with which to perform password management.

FIG. 4B depicts an example selection of an account from a plurality of accounts in accordance with the illustrative embodiments. As described with relation to FIG. 4A, the selective password synchronization mechanism presents, in screen 400 which may represent a graphical user interface (GUI) that is presented to an individual via their client computing device, information associated with each account such as, for example, Account Identifier (ID) 402, Account Service 404, and Description 406 as well as selection mechanisms 408. In accordance with the description provided in FIG. 3, when an individual selects an account or when an account is required to have its password changed, such as account 410a, the selective password synchronization mechanism implements a selective password synchronization policy that prevents personal account passwords from synchronizing with administrator accounts and Windows® account passwords from synchronizing with RACF passwords, as per one or more password synchronization rules and one or more password synchronization exclusion rules. Thus, in addition to account 410a being selected, the selective password synchronization mechanism also selects accounts 410c, 410d, and 410e, while restricting selection of accounts 410b, 410f, and 410g by preventing the selection of accounts 410b, 410f, and 410g in the GUI.

Figure 5:
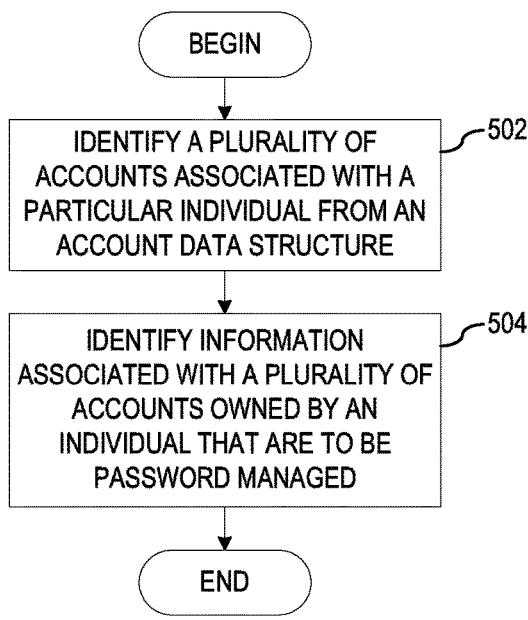
FIG. 5 depicts a flowchart outlining the operation performed in gathering account information performed by a selective password synchronization mechanism in order to provide password management in accordance with an illustrative embodiment.

FIG. 5 depicts a flowchart of the operation performed in gathering account information performed by a selective password synchronization mechanism in order to provide password management in accordance with an illustrative embodiment. As the operation begins, the selective password synchronization mechanism identifies a plurality of accounts associated with a particular individual from an account data structure that comprises a plurality of user accounts for a plurality of users (step 502). This identification may be performed, for example, when an individual wants to change a password or when one password associated with one account is required to be changed, such as when a password expires, becomes compromised, another triggering event that would cause a need for the modification of an individual's password on at least one account associated with the individual. Once the plurality of accounts is identified, the selective password synchronization mechanism identifies information associated with a plurality of accounts owned by an individual that are to be password managed (step 504). For each account, the information may include, for example, first name, middle name, last name, username, current password, account accessed by the username and password, type of the account, resource type where the account resides, location of resource, risk level of the account, or position or role of the individual within the enterprise. The operation ends thereafter.

Figure 6:
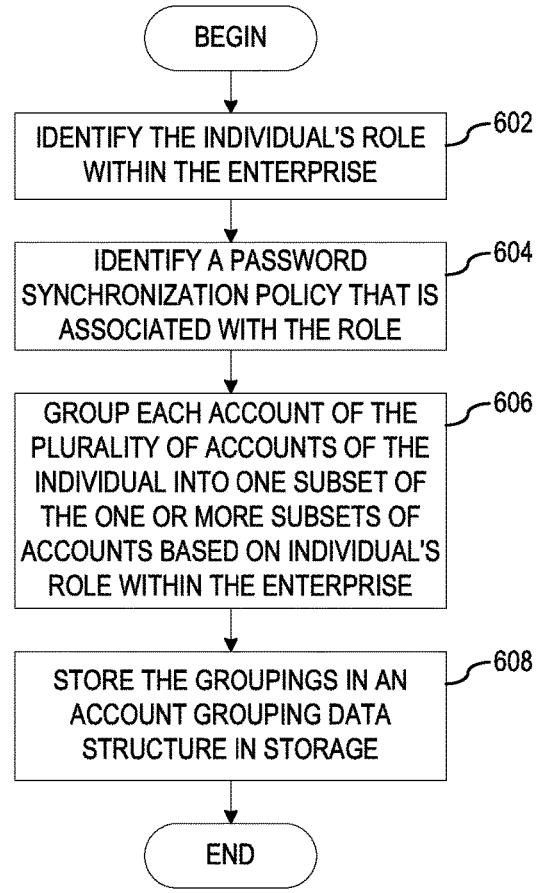
FIG. 6 depicts the operation of grouping accounts for an individual performed by a selective password synchronization mechanism in order to provide password management in accordance with an illustrative embodiment.

FIG. 6 depicts the operation of grouping accounts for an individual performed by a selective password synchronization mechanism in order to provide password management in accordance with an illustrative embodiment. It should be noted that while FIG. 6 illustrates the operation of grouping of accounts based on an individual's role(s), as noted above, the illustrative embodiments are not limited to such. Rather, in some illustrative embodiments, non-role based password synchronization polices may be utilized without departing from the spirit and scope of the illustrative embodiments.

As the operation begins, when an individual wants to change a password or when one password associated with one account is required to be changed based on the expiration of a password, a required password change, or the like, the selective password synchronization mechanism identifies the individual's role within the enterprise (step 602). Utilizing the individual's role, the selective password synchronization mechanism identifies a password synchronization policy that is associated with the role (step 604). With the identified password synchronization policy, the selective password synchronization mechanism proceeds to group each account of the plurality of accounts of the individual into one subset of the one or more subsets of accounts, where each subset of accounts comprises one or more accounts from the plurality of accounts (step 606). As each group is formed, the accounts in the group have to meet the requirements of a set of password synchronization rules and not meet requirements of a set of password synchronization exclusion rules. The password synchronization rules are defined by resource type, resource tags that are indicated in metadata, filters, a static list of specific resources, or the like. The password synchronization exclusion rules are defined by subsets of resources that should not have the same password as those defined in the password synchronization rules. Once the selective password synchronization mechanism has grouped the accounts into one or more subsets of accounts, the selective password synchronization mechanism stores the groupings in an account grouping data structure (step 608), with the operation ending thereafter. In a preferred embodiment, this grouping of each subset of accounts is performed at runtime, for example, when the password is being set, modified, or reset, rather than a persistent grouping of accounts in account grouping data structure.

Figure 7:
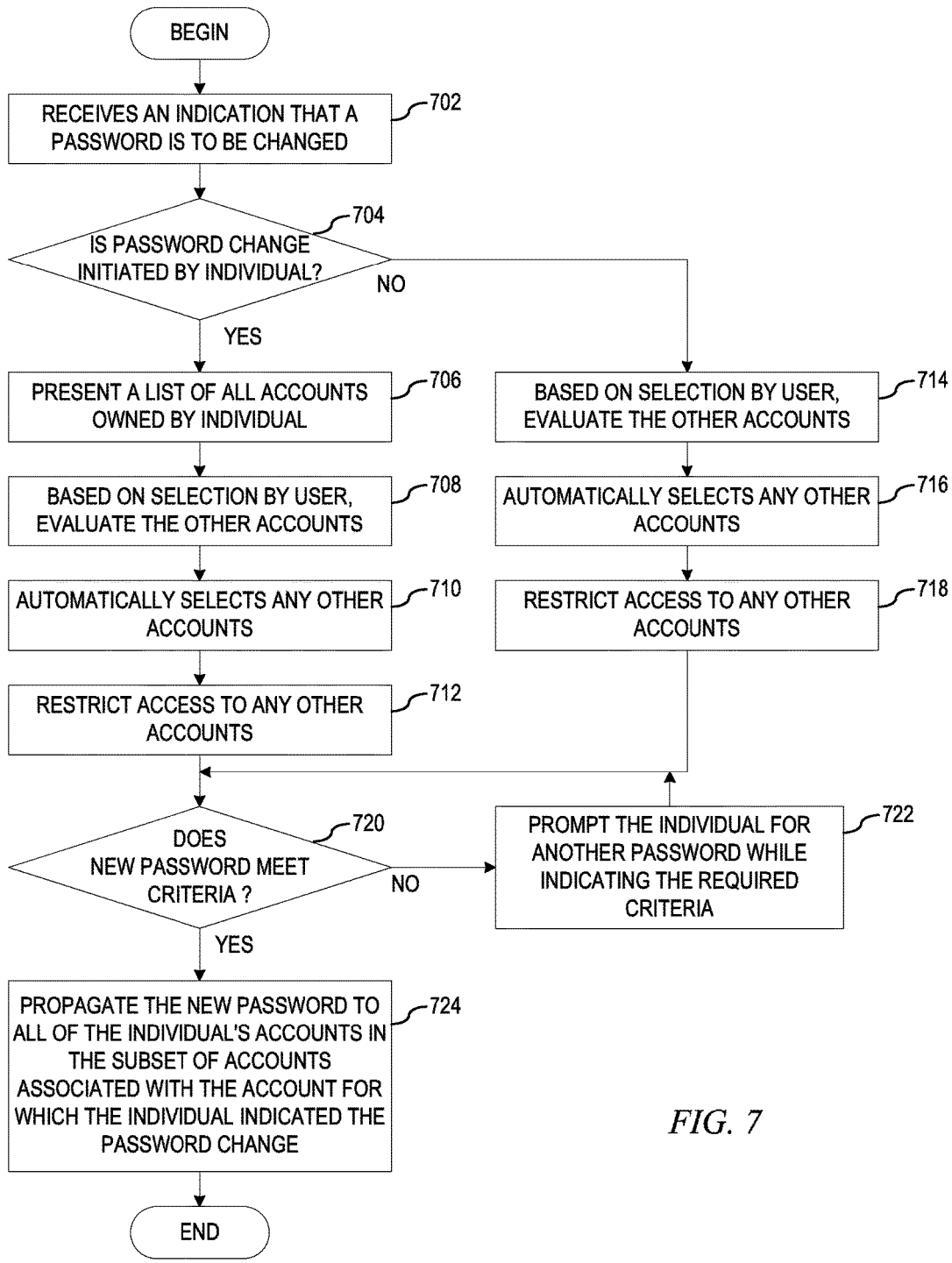
FIG. 7 depicts the operation of propagating a password for an individual performed utilizing the groupings formed by a selective password synchronization mechanism in accordance with an illustrative embodiment.

FIG. 7 depicts the operation of propagating a password for an individual performed utilizing the groupings formed by a selective password synchronization mechanism in accordance with an illustrative embodiment. As the operation begins, the selective password synchronization mechanism receives an indication that a password is to be changed for one of the accounts associated with the individual (step 702). The selective password synchronization mechanism determines whether the indication is initiated by the individual (step 704). If at step 704 the indication is initiated by the individual, the selective password synchronization mechanism presents a list of all accounts owned by the individual to the individual via a GUI or other type of output on the individual's client computing device (step 706). Upon selection of one account of the plurality of accounts by the individual via the GUI, the selective password synchronization mechanism performs the evaluation described in FIG. 6, such that the selective password synchronization mechanism evaluates the other accounts against the password synchronization rules and the password synchronization exclusion rules (step 708). The selective password synchronization mechanism then automatically selects any other accounts associated with the selected account via the groupings that are generated based on the password synchronization rules and the password synchronization exclusion rules (step 710). The selective password synchronization mechanism also restricts access to any other accounts that do not fall within the password synchronization rules and the password synchronization exclusion rules as being associated with the selected account (step 712).

If at step 704 the indication is initiated by requirement of an automated process or automatic application of a policy, the selective password synchronization mechanism performs the evaluation described in FIG. 6, such that the selective password synchronization mechanism evaluates the other accounts against the password synchronization rules and the password synchronization exclusion rules (step 714). The selective password synchronization mechanism then automatically selects any other accounts associated with the selected account that fall within the password synchronization rules and the password synchronization exclusion rules (step 716). The selective password synchronization mechanism also restricts access to any other accounts that do not fall within the password synchronization rules and the password synchronization exclusion rules as being associated with the selected account (step 718).

From step 712 or step 718, the selective password synchronization mechanism determines whether the new password meets the criteria associated with the account and the subset of accounts in which the account is grouped (step 720). If at step 720 the selective password synchronization mechanism determines that the new password fails to meet the criteria, then the selective password synchronization mechanism prompts the individual for another password while indicating the required criteria (step 722), with the operation returning to step 720 thereafter.

If at step 720 the selective password synchronization mechanism determines that the new password meets the criteria, the selective password synchronization mechanism propagates the new password to all of the individual's accounts in the subset (grouping) of accounts associated with the account for which the individual indicated the password change (step 724) while not propagating the password to other accounts that are not in the subset of accounts associated with the account for which the individual indicated the password change. The operation ends thereafter.

Thus, the illustrative embodiments provide mechanisms for selective password synchronization. Granular level password synchronization is provided through password synchronization policies, password synchronization rules, and/or password synchronization exclusion rules, where selective assignment of resources, account types, individual types, or any other types of filtering mechanisms are utilized to determine among which accounts, passwords associated with those accounts, are to be synchronized. The password synchronization policies groups the accounts of an individual utilizing one or more password synchronization rules and one or more password synchronization exclusion rules, which may be based on individual's role within the enterprise or based on some other predetermined criteria associated with the individual. That is, a password synchronization policy dictates which of an individual's accounts will have their passwords synchronized during a password change or account creation or restoration based on predetermined criteria.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for selective password synchronization, the method comprising:

receiving, by a processor in the data processing system, an indication that a password is to be changed for an account in a plurality of accounts associated with an individual, wherein the indication includes a new password;

responsive to receiving the indication of the password change, grouping, by the processor, the account with one or more other accounts in the plurality of accounts thereby forming a first subset of accounts, wherein grouping the account with the one or more other accounts in the plurality of accounts excludes at least one account in the plurality of accounts thereby forming a second subset of accounts;
determining whether the new password meets criteria associated with the account and subset of accounts in which the account is grouped; and responsive to the new password meeting the criteria:
propagating, by the processor, the new password to the first subset of accounts according to a first policy; and
propagating, by the processor, the new password to a second subset of accounts of the plurality of accounts according to a second policy, wherein the second policy is different from the first policy.

2. The method of claim 1, wherein the second policy is not propagating the password to other accounts in the second subset of accounts.

3. The method of claim 1, wherein the password is changed either actively by the individual or reactively based on one or more accounts in the plurality of accounts requiring a password change.

4. The method of claim 1, wherein subsets of accounts of the plurality of accounts are formed by the method comprising:
identifying, by the processor, the individual's role within an enterprise;
utilizing the individual's role, identifying, by the processor, a password synchronization policy associated with the individual's role; and
grouping, by the processor, each account in the plurality of accounts associated with the individual into one account of one or more subsets of accounts based on individual's role within the enterprise while meeting the requirements of a set of password synchronization rules and a set of password synchronization exclusion rules.

5. The method of claim 1, wherein subsets of accounts of the plurality of accounts are formed by the method comprising:
grouping, by the processor, each account in the plurality of accounts associated with the individual into one account of one or more subsets of accounts utilizing requirements of a set of password synchronization rules and a set of password synchronization exclusion rules, wherein the set of password synchronization exclusion rules define elements that are not to be synchronized as those defined in the password synchronization rules.

6. The method of claim 1, wherein subsets of accounts of the plurality of accounts are formed by the method comprising:
grouping, by the processor, each account in the plurality of accounts associated with the individual into one account of one or more subsets of accounts utilizing requirements of a set of password synchronization rules and a set of password synchronization exclusion rules, wherein the set of password synchronization rules define static elements with which passwords are to be synchronized, wherein the static elements include at least one of a set of resources or a set of account types.

7. A computer program product comprising a computer readable storage medium having a computer readable program stored therein, wherein the computer readable program, when executed on a computing device, causes the computing device to: receive an indication that a password is to be changed for an account in a plurality of accounts associated with an individual, wherein the indication includes a new password;
responsive to receiving the indication of the password change, group the account with one or more other accounts in the plurality of accounts thereby forming a first subset of accounts, wherein arouping the account with the one or more other accounts in the plurality of accounts excludes at least one account in the plurality of accounts thereby forming a second subset of accounts;
determining whether the new asswerd meets criteria associated with the account and subset of accounts in which the account is grouped; and
responsive to the new password meeting the criteria:
propagate the new password to the first subset of accounts according to a first policy; and
propagate the new password to a second subset of accounts of the plurality of accounts according to a second policy, wherein the second policy is different from the first policy.

8. The computer program product of claim 7, wherein the second policy is not propagating the password to other accounts in the second subset of accounts.

9. The computer program product of claim 7, wherein the password is changed either actively by the individual or reactively based on one or more accounts in the plurality of accounts requiring a password change.

10. The computer program product of claim 7, wherein subsets of accounts of the plurality of accounts are formed by the computer readable program further causing the computing device to:
identify the individual's role within an enterprise;
utilizing the individual's role, identify a password synchronization policy associated with the individual's role; and
group each account in the plurality of accounts associated with the individual into one account of one or more subsets of accounts based on individual's role within the enterprise while meeting the requirements of a set of password synchronization rules and a set of password synchronization exclusion rules.

11. The computer program product of claim 7, wherein subsets of accounts of the plurality of accounts are formed by the computer readable program further causing the computing device to:
group each account in the plurality of accounts associated with the individual into one account of one or more subsets of accounts utilizing requirements of a set of password synchronization rules and a set of password synchronization exclusion rules, wherein the set of password synchronization exclusion rules define elements that are not to be synchronized as those defined in the password synchronization rules.

12. An apparatus comprising:
a processor; and
a memory coupled to the processor, wherein the memory comprises
instructions which, when executed by the processor, cause the processor to:
receive an indication that a password is to be changed for an account in a plurality of accounts associated with an individual, wherein the indication includes a new password;
responsive to receiving the indication of the password change, group the account with one or more other accounts in the plurality of accounts thereby forming a first subset of accounts, wherein grouping the account with the one or more other accounts in the plurality of accounts excludes at least one account in the plurality of accounts thereby forming a second subset of accounts;

determining whether the new password meets criteria associated with the account and subset of accounts in which the account is grouped: and responsive to the new password meeting the criteria:
propagate the new password to the first subset of accounts according to a first policy; and
propagate the new password to a second subset of accounts of the plurality of accounts according to a second policy, wherein the second policy is different from the first policy.

13. The apparatus of claim 12, wherein the second policy is not propagating the password to other accounts in the second subset of accounts.

14. The apparatus of claim 12, wherein the password is changed either actively by the individual or reactively based on one or more accounts in the plurality of accounts requiring a password change.

15. The apparatus of claim 12, wherein subsets of accounts of the plurality of accounts are formed by the instructions further causing the processor to:

identify the individual's role within an enterprise;
utilizing the individual's role, identify a password synchronization policy associated with the individual's role; and
group each account in the plurality of accounts associated with the individual into one account of one or more subsets of accounts based on individual's role within the enterprise while meeting the requirements of a set of password synchronization rules and a set of password synchronization exclusion rules.

16. The apparatus of claim 12, wherein subsets of accounts of the plurality of accounts are formed by the instructions further causing the processor to:
group each account in the plurality of accounts associated with the individual into one account of one or more subsets of accounts utilizing requirements of a set of password synchronization rules and a set of password synchronization exclusion rules, wherein the set of password synchronization exclusion rules define elements that are not to be synchronized as those defined in the password synchronization rules.

* * * * *